(12) United States Patent
Wisen (10) Patent No.: US 8,261,464 B2
(45) Date of Patent: Sep. 11, 2012

(54) SWIVEL MOUNTING DEVICE

(76) Inventor: Denis R. Wisen, Painesville, OH (US)

( * ) Notice: Subject to any disclaimer, the term of this patent is extended or adjusted under 35 U.S.C. 154(b) by 88 days.

(21) Appl. No.: 13/026,329

(22) Filed: Feb. 14, 2011

(65) Prior Publication Data

US 2011/0135410 A1 Jun. 9, 2011

Related U.S. Application Data

(63) Continuation of application No. 11/604,138, filed on Nov. 24, 2006, now abandoned.

(60) Provisional application No. 60/741,261, filed on Dec. 1, 2005.

(51) Int. Cl.
*G01D 5/347* (2006.01)
*G01B 5/14* (2006.01)

(52) U.S. Cl. .......................................... 33/706; 33/783

(58) Field of Classification Search ................ 33/706, 33/707, 708, 783, 784, 803
See application file for complete search history.

(56) References Cited

U.S. PATENT DOCUMENTS

| | | | |
|---|---|---|---|
| 877,934 A | 2/1908 | Lea | |
| 1,880,979 A | 10/1932 | Parker | |
| 4,229,883 A * | 10/1980 | Kobashi | 33/784 |
| 4,572,492 A | 2/1986 | Kawakita | |
| 4,796,508 A | 1/1989 | Hoshino | |
| 4,961,269 A | 10/1990 | Luttmer | |
| 4,974,332 A | 12/1990 | Luttmer | |
| 5,069,433 A | 12/1991 | Womack | |
| 5,092,058 A | 3/1992 | Luttmer | |
| 5,207,007 A | 5/1993 | Cucinotta | |
| 5,327,653 A * | 7/1994 | Pistorius et al. | 33/1 M |
| 5,564,664 A | 10/1996 | Oschwald | |
| 6,880,442 B2 | 4/2005 | Duginske | |
| 7,231,858 B2 * | 6/2007 | Oberheim | 33/706 |
| 8,004,664 B2 * | 8/2011 | Etter et al. | 356/139.04 |
| 2012/0023768 A1 * | 2/2012 | Stockman | 33/784 |

* cited by examiner

*Primary Examiner* — G. Bradley Bennett
(74) *Attorney, Agent, or Firm* — James A. Lucas; Driggs, Hogg, Daugherty & Del Zoppo Co., LPA (57) ABSTRACT

A device comprising a swivel mount and its method of use are described. The device can be used in pairs with a variety of different power tools useful for working on metal or wood. The purpose of the tool is to insure a precise linear alignment between the measuring device and the moving part of the power tool that removes material from the wood or metal. The swivel mount includes a mounting block, a ball shank, and a swivel body mounted on the ball of the shank. The swivel mount attaches to one portion of the measuring device that is linearly adjustable with respect to the material removing part of the power tool. A second swivel mount attaches to a portion of the power tool that maintains a fixed distance with respect to the moving part of the power tool.

20 Claims, 8 Drawing Sheets

SWIVEL MOUNTING DEVICE

CROSS-REFERENCE TO RELATED APPLICATIONS

This application is a continuation of application Ser. No. 11/604,138, filed Nov. 24, 2006, which claims priority of provisional patent application Ser. No. 60/741,261, filed Dec. 1, 2005.

FIELD OF THE INVENTION

This invention relates generally to the field of woodworking and metal working equipment. More particularly, the invention relates to mounting brackets and their use to facilitate precise measurements when performing an operation on a work piece.

BACKGROUND OF THE INVENTION

The old adage among carpenters, woodworkers and machinists in order to avoid costly and time-consuming mistakes is "measure twice and cut once". This guideline is normally learned only through the experiences of making many mistakes in the workshop.

Woodworkers and machinists are constantly seeking more accurate and reliable techniques for sawing, routing, milling, turning, and drilling wood and metal. One variable that has consistently evaded precision is the requirements for accurately gauging the amount of material to be removed during a processing step.

BRIEF DESCRIPTION OF THE INVENTION

The present invention relates to a swivel mounting device that comprises a mounting block for mounting the device on a power tool such as a woodworking or metal working machine. The swivel mounting device includes a ball shank with a shaft having one end secured to a mounting block, and the second end terminating in a ball. A swivel body is mounted on the ball end of the shank. This swivel body is capable of being clamped or otherwise affixed to a portion of a measuring device such as calipers. The swivel body includes a recess in which the ball of the ball shank is retained. The measuring device is typically secured in a slot in the swivel body. The mounting block is attached to the power equipment by suitable means such as a magnet, cement or clamp.

The invention also relates to a method of making accurate measurements when working with a power tool used for the removal of material from an object. The method compensates for angularity mis-alignment between the power tool and a measuring device that defines a spatial relationship between the material removal portion of the tool and a portion of the object to be removed. The method comprises providing a first swivel device for holding a first portion of the measuring device. This first device is mounted on a portion of the power tool that maintains a fixed spatial relationship with the material removal part of the tool. A second device holds a second portion of the measuring device that is movable with respect to the material removal part of the tool. The two swivel devices are spaced apart from one another and allow for changes in the angularity between the measuring device and the power tool without changing the linear spacing between the stationary and the movable portions of the measuring device.

BRIEF DESCRIPTION OF THE DRAWINGS

FIG. 9b is a close-up view of the devices of the present invention mounted on the table saw of FIG. 9a.

DETAILED DESCRIPTION OF THE INVENTION

The swivel mount of the present invention is useful on power equipment such as table saws, jig saws, band saws, milling machines, bench drills, turret lathes, planers and routers of the types typically used for working on wood and metal. As shown in FIGS. 1-4, the device 10 comprises three principal components. These are a mounting block 20, a ball shank 40, and a swivel body 60. The mounting block 20 allows the device to be coupled to the power equipment. In one embodiment, the mounting block is attached to a base plate 22 by two Allen head screws 32 inserted through holes 36 in the block into corresponding holes 24 in the base plate 22. This base plate 22 is adapted to be mounted on the power equipment by extending the set screws 32 through the base plate 22 into threaded holes in the equipment. The device may also be coupled to the table saw or other equipment by the use of a magnet or an adhesive a well as clamps or other mechanical attachments of the type well known to the skilled artisan.

The ball shank 40 typically consists of a hardened steel ball 42 at one end of a shaft 44. The free end 46 of the shaft is inserted into a hole 38 in the mounting block 20 and is secured in place by suitable means such as a set screw 28 threaded into hole 30. The ball 42 of the ball shank 40 is mounted within a recess 68 of the swivel body 60. The shaft 44 preferably has a flat section 48 (shown in FIGS. 1 and 2) against which the set screw 28 is tightened to secure the shaft to the mounting block 20 and to prevent rotation of the shaft in the mounting block 20 while not inhibiting oscillation of the swivel body 60 around the ball end of the shank 40.

Figure 9A:
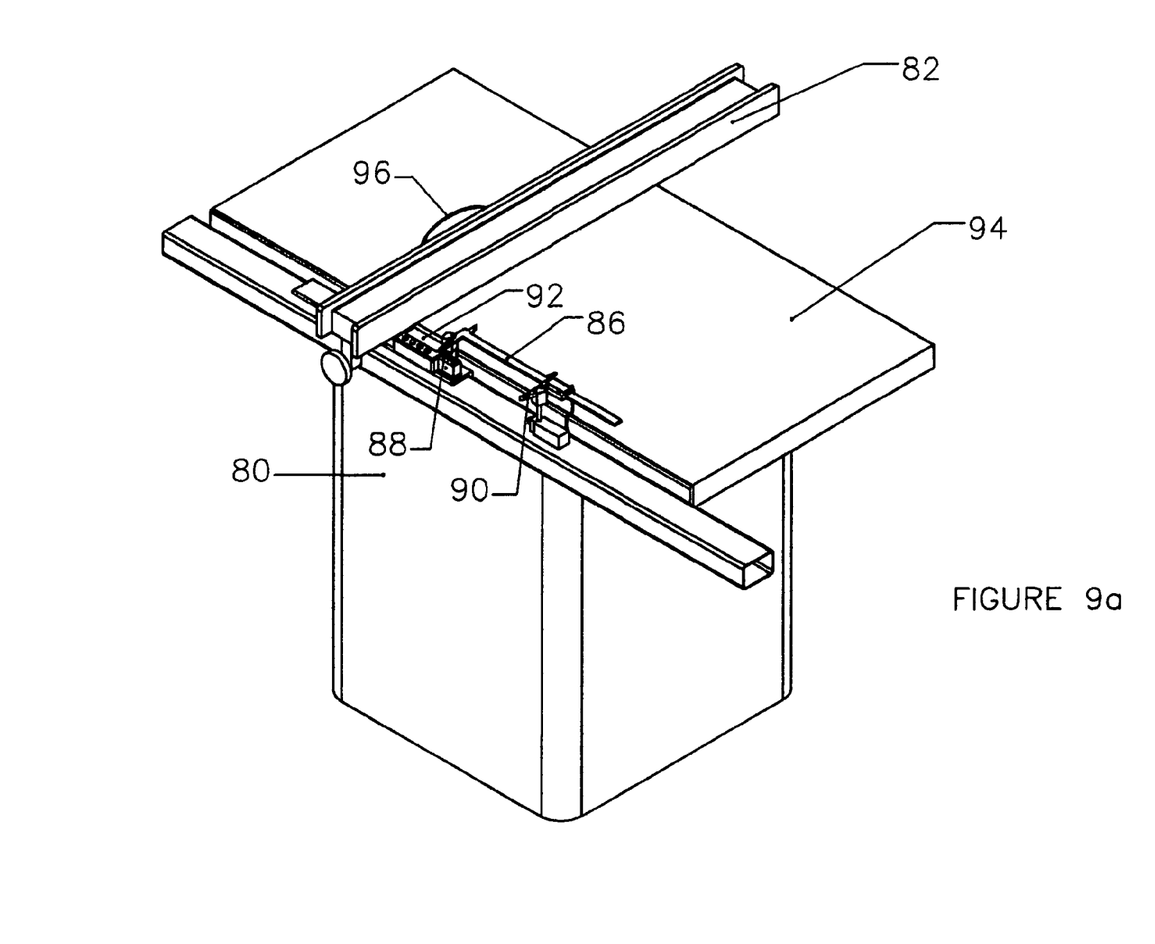
FIG. 9a is a schematic view showing the a pair of the devices of the present invention used in association with a table saw.
Figure 9B:
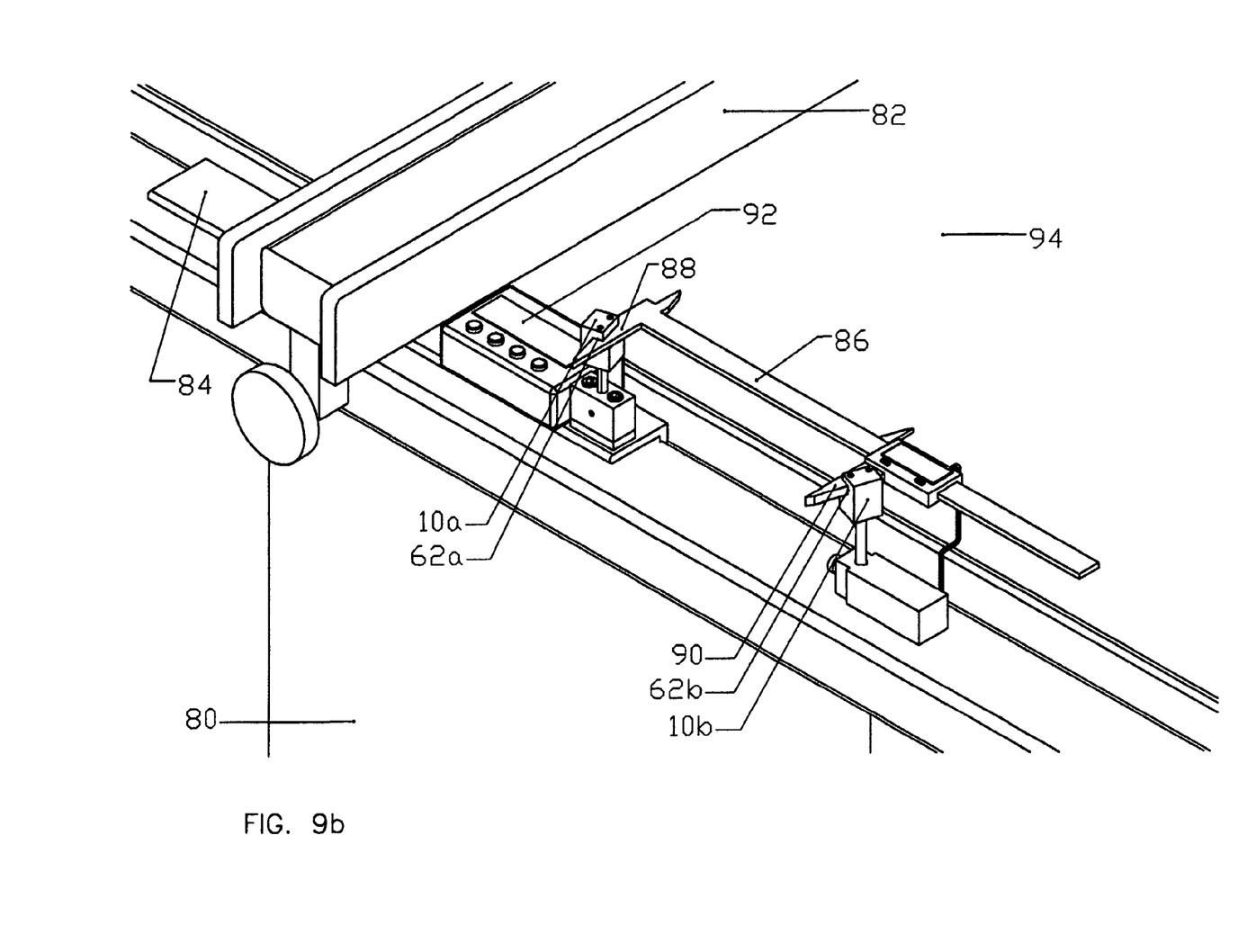

Two of the devices of the present invention are used in tandem with one another and are attached to two parts of a measuring device, at least one of which is movable in a linear direction toward and away from the other. For example, one device may be connected to a stationary jaw of calipers as shown in FIGS. 9a and 9b. The other device is secured to the other movable jaw which may be coupled, mechanically or electrically to a suitable readout such as a digital or a linear scale.

Figure 1:
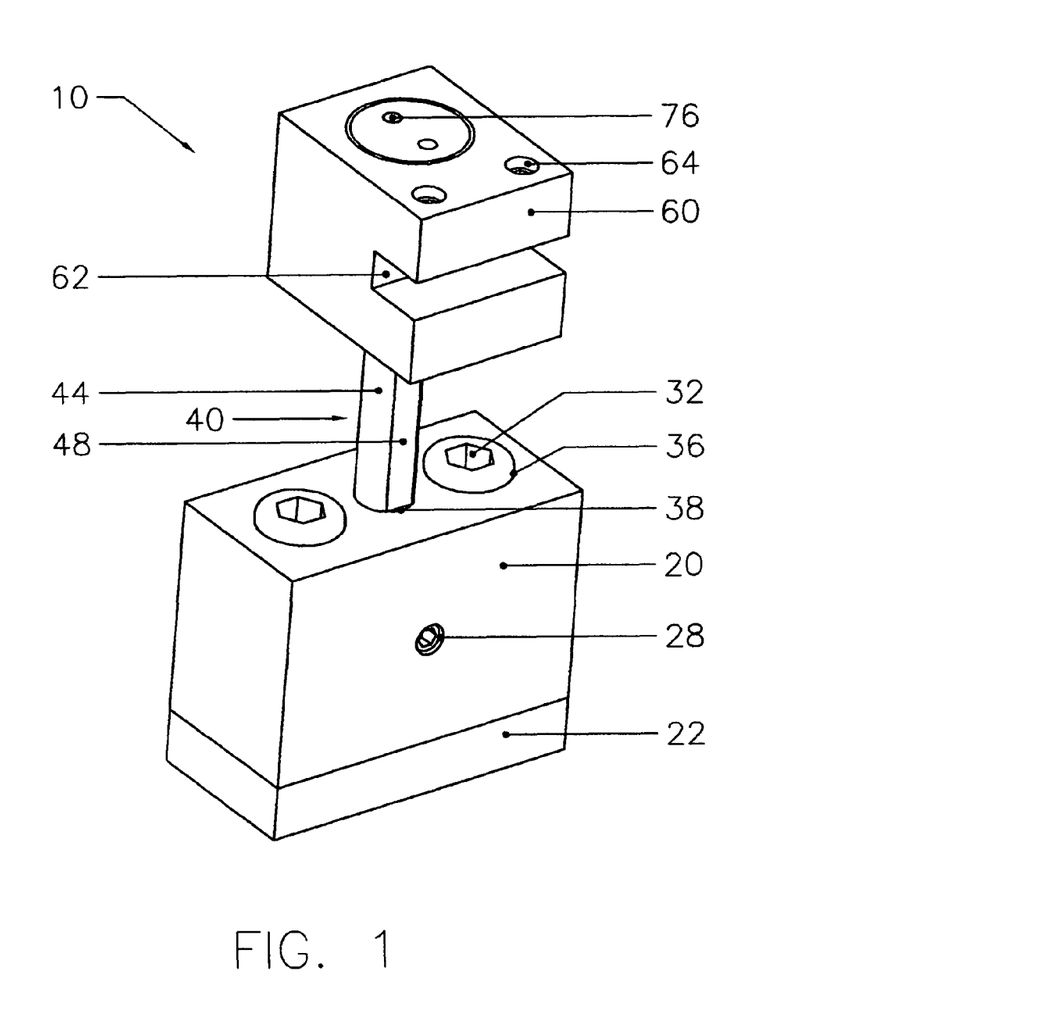
FIG. 1 is a perspective view of the device of the present invention.
Figure 2:
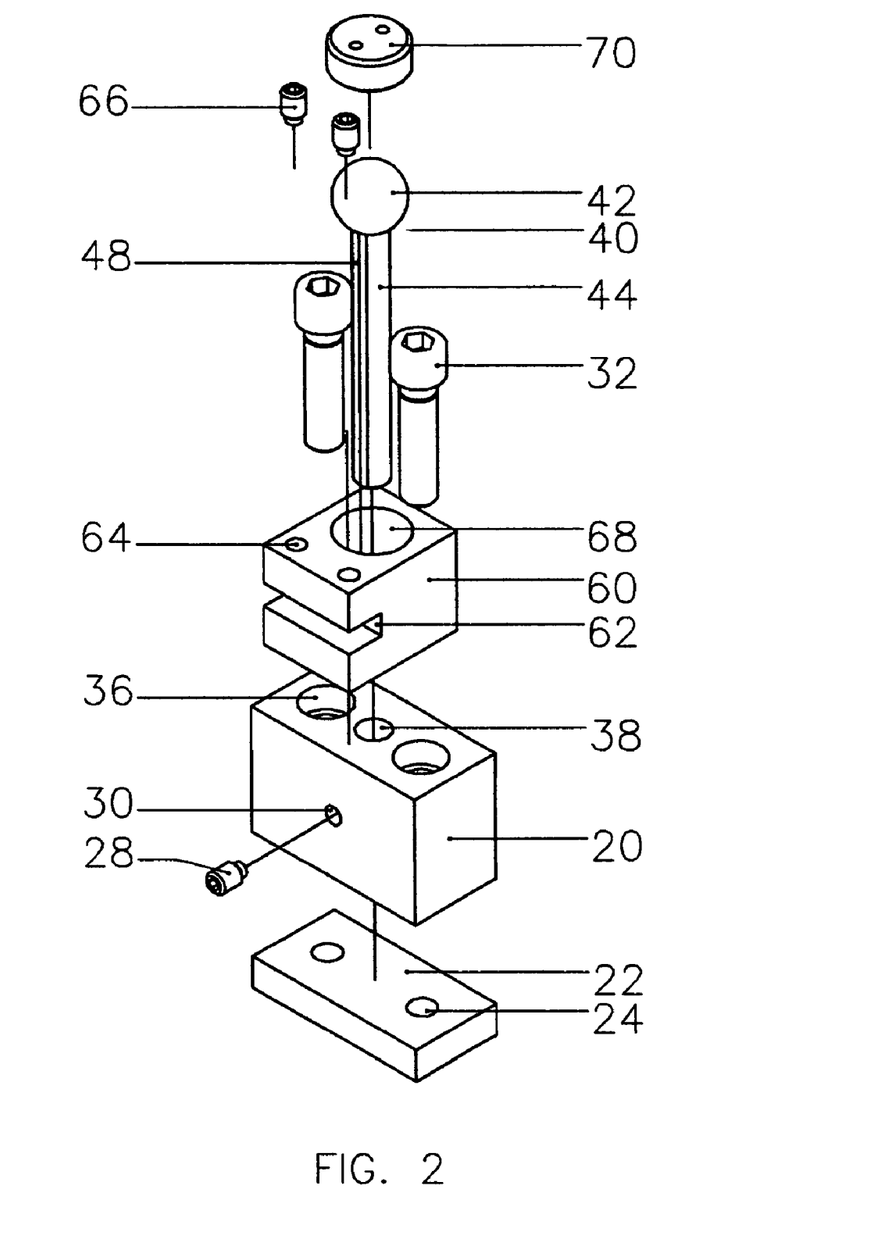
FIG. 2 is an exploded view of the device shown in FIG. 1.
Figure 3:
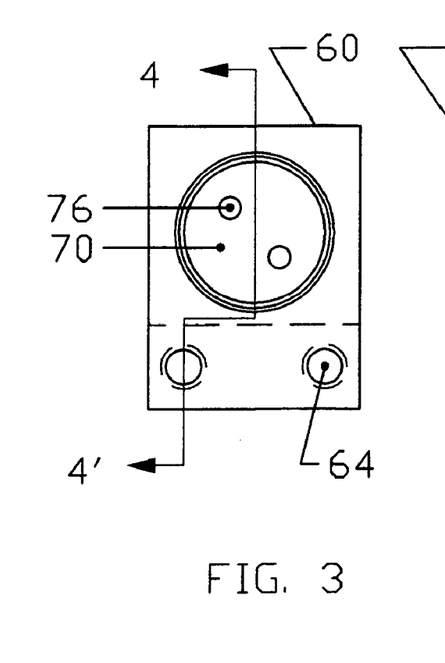
FIG. 3 is a top view of the swivel mount of FIG. 1.
Figure 4:
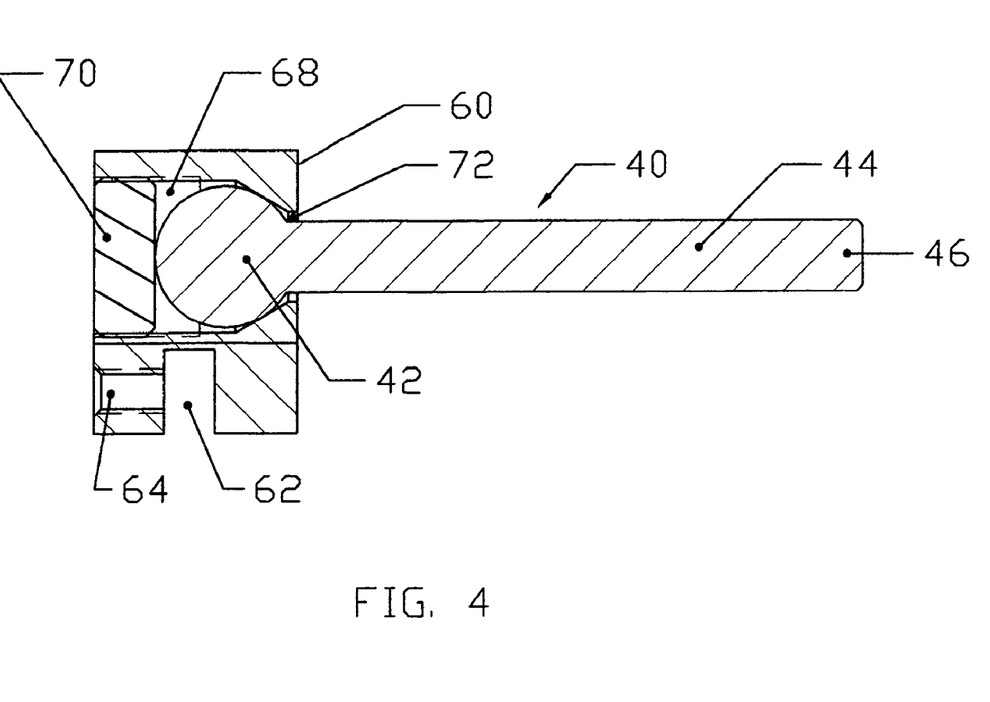
FIG. 4 is a view taken along lines 4-4' of FIG. 3.
Figure 5:
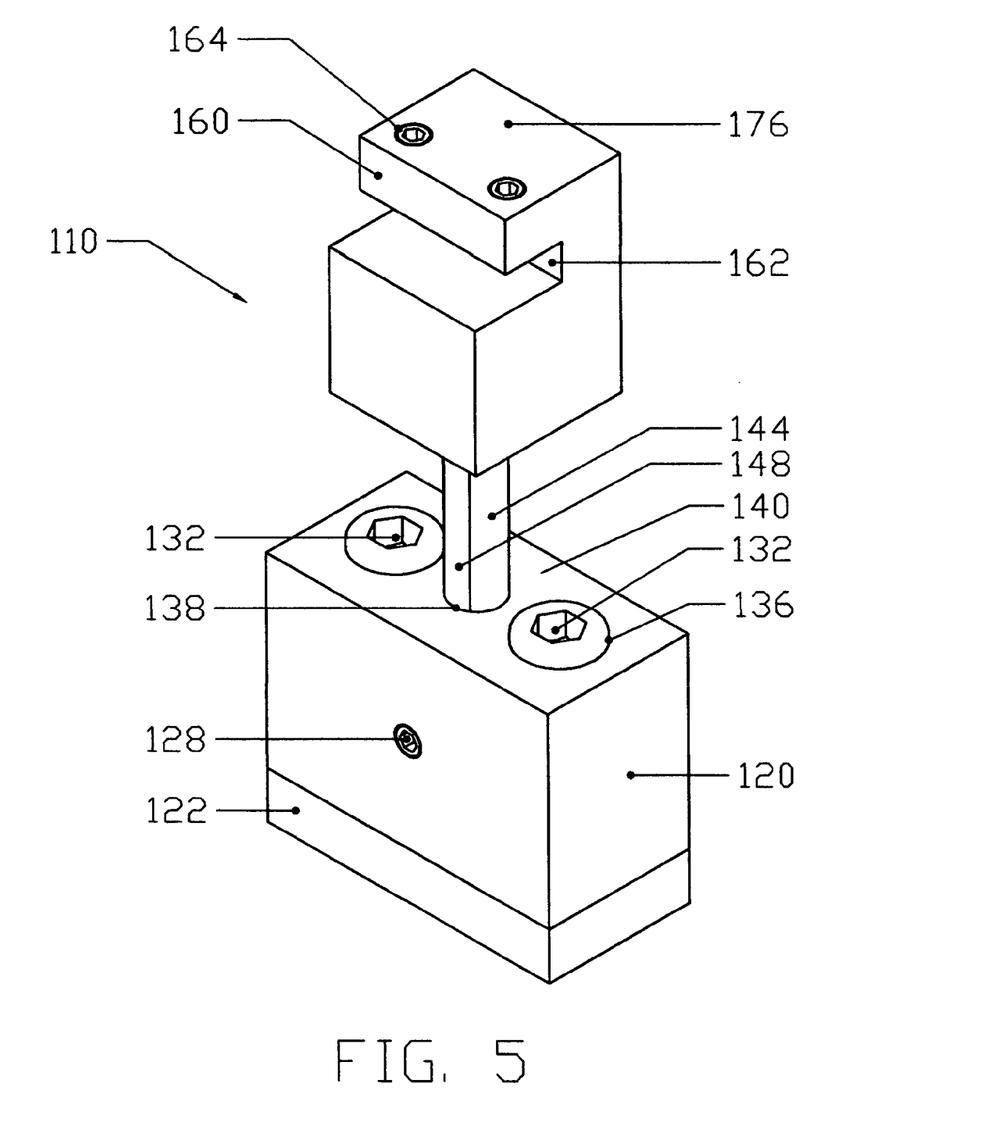
FIG. 5 is a perspective view showing a variation of the present invention.
Figure 6:
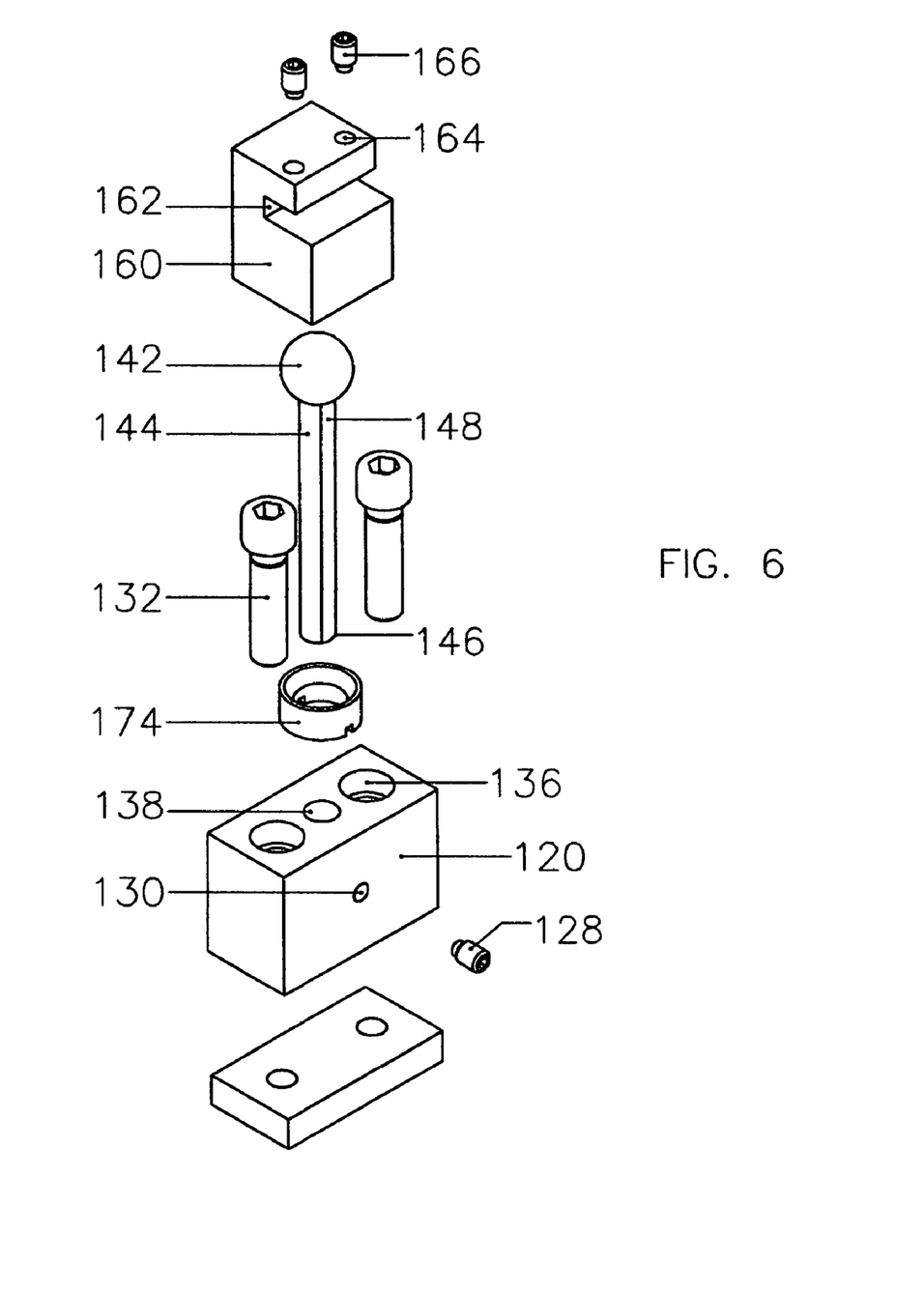
FIG. 6 is an exploded view of the device shown in FIG. 5.
Figure 7:
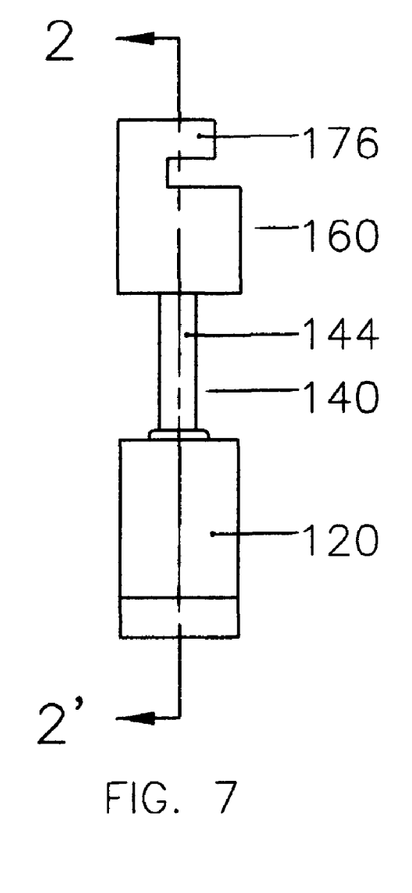
FIG. 7 is an elevational side view of the device of FIG. 5.
Figure 8:
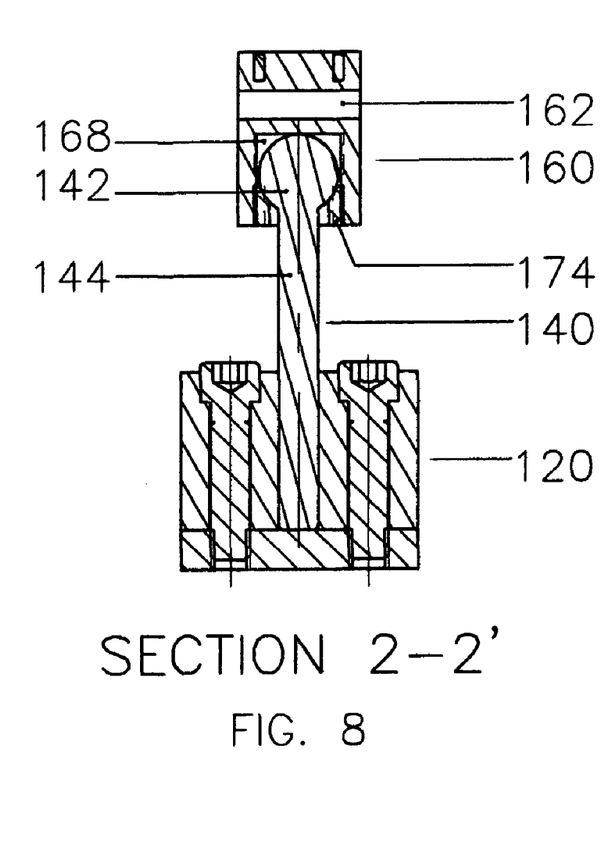
FIG. 8 is a cross sectional view taken along lines 2-2' of FIG. 7.

As shown in FIGS. 3 and 4, the swivel body 60 contains a slot 62 to hold one of the jaws of a caliper and two threaded holes 64 to receive a pair of set screws 66 to secure the swivel body to the jaw. A recess 68 extends into the body from one surface to receive the ball 42 of the ball shank 40. The shaft 44 of the ball shank extends through a hole 72 in the surface of the swivel body 60 that is opposite the recess 68. A cap 70, typically made from the same material as the swivel body, is threaded or cemented into the opening of the recess 68 to anchor the ball 42 in place. The cap 70 is shown with two holes 76 adapted to receive a tool for tightening and loosening the cap. Instead of the two holes, the cap can be slotted for use with a screwdriver to facilitate tightening and loosening of the cap. The cap should be sufficiently tight to secure the ball against linear movement while allowing it to rotate within the recess. If necessary, a small amount of a lubricant may be used to ensure smooth rotational movement of the ball 42 vis-à-vis the recess 68. The oscillation of the swivel body 60 relative to the ball shank 40 serves to compensate for non linear movement of the measuring device with respect to the power equipment while at the same time maintaining an extremely close tolerance as the jaws of the calipers move relative to one another in a linear direction.

The free end 46 of the shank is adapted to be secured by a set screw 28 threaded in a hole 30 in the mounting block 20. The ball inserted into the swivel mount allows non-linear movement such as changes of the angle between the calipers and the power equipment without changing alignment of the jaws of the calipers in the linear direction of movement, thus preserving the accuracy of the measurements. Therefore, the need for absolute rigidity between the calipers or other measuring device and the power equipment is eliminated.

FIGS. 5-8 show another option for holding the ball of the shank in the swivel body. As with the embodiment in FIGS. 1-4, the device 110 is adapted to be mounted on a piece of woodworking or metal working equipment (not shown) using a base plate 122 that is magnetically, adhesively or mechanically coupled to the equipment. The mounting block 120 is secured to the base plate with a pair of Allen head screws 132 extending through holes 136 (shown in FIG. 6) in the block. The free end 146 of the ball shank 140 is inserted into the mounting block through hole 138 and is secured in place with set screw 128 threaded into hole 130 and tightened against the planar portion 148 of the shaft 144 as previously described. The swivel body 160 has a slot 162 to receive one of the caliper jaws (not shown) and includes a pair of set screws 166 threaded into holes 164. The swivel body contains a blind recess 168 (shown in FIG. 8) opening into the body from the bottom. Because the blind recess 168 is accessible from beneath the body, the top 176 of the body may be recessed or set back above the slot if desired. As shown in cross section in FIG. 8, the annular ring 174 slips around the shank and is threaded, cemented or press fit into the bottom of the swivel block in the opening of the recess 168 to retain the ball in the recess, while not inhibiting relative angular movement of the swivel body 160 with respect to the ball 142. As can be seen, the hardened metal ball 142 of the ball shank 140 engages the recess 168 in the swivel mount 160. The free end 146 of the shank 144 is secured by the set screw 128 in hole 130 in the mounting block 120. The ball inserted into the swivel mount allows non-linear movement such as changes of the angle between the calipers and the power equipment without changing alignment of the jaws of the calipers in the linear direction of movement, thus preserving the accuracy of the measurements. When a pair of the devices of the invention are used on a table saw, router table or band saw, the mounting block of one device 10a is attached to the rip fence or other guide and mounting block of the other device 10b is attached to the table. This is seen in FIGS. 9a and 9b showing a table saw 80 equipped with a traditional rip fence 82. The fence is welded or otherwise secured to a metal bar 84 that is at right angle to the fence and that moves at right angles to the direction of cut. Calipers 86 include a first jaw 88, and a second jaw 90 movable relative to the first jaw. A digital readout 92 is mounted on the calipers to measure the opening between the two jaws. The first jaw 88 of the calipers is secured in the slot 62a of the first swivel mount 10a, and the second jaw is secured in the slot 62b of the second swivel mount 10b. The two jaws of the caliper move at right angles to the planar face of the saw blade (96 in FIG. 9b). The swivel feature of the mounting devices allows them to grip the respective jaws of the calipers at virtually any angle without impeding the linear movement of the jaws with respect to one another.

One fence that has been found to be particularly capable of providing a true cut when used with a variety of table saws is the Biesemeyer fence. Other fences on which one of the devices of the present invention can be mounted are available from suppliers such as Black & Decker, Craftsman, Delta, Dewalt, Ryobi and Shopsmith. Generally, these fences are used with the supplier's own particular brand of saw or router table.

The mounting block may be machined from any suitable metal such as steel or may be made from a polymeric substance such as Delrin, nylon or polypropylene, by machining or molding. The digital calipers that are useful in the practice of the present invention are available from such manufacturers as Brown & Sharp, Mahr, Mitutoyo, and Starrett.

Instead of digital calipers, analog calipers and other linear measuring device such as a precision yardstick or ruler may be used to achieve a high level of accuracy in the linear measurements.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the invention as shown and described herein.

What is claimed is:

1. A device for making accurate linear measurements comprising;
   a. A linear measuring device;
   b. Two swivel devices relatively movable in a linear direction toward and away from one another along the linear measuring device, each swivel device comprising:
      1. A mounting block;
      2. A ball shank having one end secured to the mounting block to prevent rotation of the shank, the other end terminating in a ball; and
      3. A swivel body having a recess and being detachably secured to the linear measuring device;
   wherein the ball of the shank is retained in said recess while not inhibiting relative angular movement of the swivel body with respect to the ball.

2. The device according to claim 1 wherein the linear measuring device comprises a caliper having a linear scale and first and second relatively movable jaws.

3. The device according to claim 2 wherein each swivel body includes a slot into which one of the jaws is secured.

4. The device according to claim 1 wherein each swivel mount oscillates around the ball end of the respective ball shank.

5. The device according to claim 4 wherein oscillation of each swivel body around the ball end of the respective shank allows for changes in angularity between the two jaws of the caliper without changing their linear spacing.

6. The device according to claim 5 wherein the swivel body contains a recess to receive the ball end of the ball shank, with the ball end retained in the recess by an annular ring surrounding the ball shank.

7. The device according to claim 1 wherein each swivel body contains a blind recess in which the ball end of the respective ball shank is retained by a cap.

8. A power tool comprising:
a. A rotating tool for performing an operation on an object;
b. A linear measuring device having two parts that are relatively movable in a linear direction with respect to one another, said device used with said power tool for accurately measuring the operation on said object;
c. A first swivel device comprising 1) a mounting block secured to a portion of the power tool that is maintained at a fixed distance from the rotating tool; 2) a ball shank having a first end secured to the mounting block to prevent rotation of said shank, and a second end terminating in a ball; and 3) a swivel body mounted on the ball end of the ball shank and clamped to one of the relatively movable parts of the measuring device; and
d. A second swivel device comprising 1) a mounting block secured to a portion of the power tool that is linearly movable with respect to the rotating tool; 2) a second ball shank having a first end secured to the second mounting block and a second end terminating in a ball; and 3) a second swivel body mounted on the ball end of the ball shank clamped to the other relatively movable part of the measuring device.

9. The power tool according to claim 8 wherein the linear measuring device includes a linear readout, and the first swivel device is coupled to the linear readout.

10. The power tool according to claim 8 wherein the linear measuring device comprises a caliper having a pair of relatively movable jaws, and each swivel body is clamped to one of the jaws.

11. A method of making accurate measurements when working with a power tool used for the removal of material from an object while compensating for angularity alignment between the power tool and a linear measuring device that defines a spatial relationship between the material removal portion of the tool and a portion of the object to be removed, the method comprising providing a first swivel device for holding a first portion of the measuring device, said swivel device mounted on a portion of the power tool that maintains a fixed spatial relationship with the material removal part of the tool, and a second swivel device for holding a second portion of the measuring device that is movable with respect to the material removal part of the tool, wherein the two swivel devices are spaced apart from one another and allow for changes in the angularity between the measuring device and the power tool without changing the linear spacing between the two portions of the measuring device.

12. The method according to claim 11 wherein said first device and said second device each comprise a) a mounting block for mounting the swivel device to said power tool; b) a ball shank comprising a shaft having a first end secured to the mounting block and a second end terminating in a ball, and c) a swivel body mounted on the second end of the ball shank, said swivel body being affixed to one portion of a linear measuring device such as a caliper for use in making measurements of a piece of wood or metal on which the power equipment performs an operation.

13. The method according to claim 12 wherein the swivel body includes a recess in which the ball of the ball shank is retained.

14. The method according to claim 13 wherein one portion of said measuring device is received and secured in a slot in the swivel body.

15. The method according to claim 14 wherein the mounting block is fixedly attached to the power tool.

16. The method according to claim 15 including securing the mounting to the power equipment using cement, clamps or magnets.

17. The method according to claim 16 wherein the shaft of the ball shank includes a planar portion and the mounting block includes at least one set screw that bears against the planar portion to prevent relative rotational motion between the mounting block and the ball shank.

18. The method according to claim 17 wherein the swivel body includes a hole in the bottom of the recess through which the shaft of the ball shank passes, and means for retaining the ball in the recess.

19. The method according to claim 11 wherein the power tool is a wood working tool selected from the group consisting of a circular saw, a drill, a router, a planer, and a lathe.

20. The method according to claim 11 wherein the measuring device is a caliper, with the first portion being a movable jaw, and the second portion being a fixed jaw.

* * * * *